US008643223B2

(12) United States Patent
Agostinelli

(10) Patent No.: US 8,643,223 B2
(45) Date of Patent: Feb. 4, 2014

(54) FEEDING DEVICE WITH SOLAR CELLS, WORKING WITH ARTIFICIAL LIGHT SOURCES, FOR ELECTRONIC EQUIPMENTS

(75) Inventor: Paolo Agostinelli, Venice (IT)

(73) Assignees: Paolo Agostinelli, White Plains, NY (US); St. Francis of Assisi Foundation, White Plains, NY (US)

( * ) Notice: Subject to any disclaimer, the term of this patent is extended or adjusted under 35 U.S.C. 154(b) by 1508 days.

(21) Appl. No.: 10/476,139

(22) PCT Filed: Sep. 25, 2001

(86) PCT No.: PCT/IT01/00493
§ 371 (c)(1),
(2), (4) Date: Oct. 24, 2003

(87) PCT Pub. No.: WO02/087064
PCT Pub. Date: Oct. 31, 2002

(65) Prior Publication Data
US 2004/0155531 A1 Aug. 12, 2004

(30) Foreign Application Priority Data
Apr. 24, 2001 (IT) .............................. RM2001A0222

(51) Int. Cl.
*G05F 3/06* (2006.01)
(52) U.S. Cl.
USPC ........................................................ 307/151
(58) Field of Classification Search
USPC ........... 307/151, 150; 250/551; 136/252, 248, 136/251; 322/2 R; 345/211; 320/101; D13/102
See application file for complete search history.

(56) References Cited

U.S. PATENT DOCUMENTS

| 4,382,273 | A | * | 5/1983 | Jones ............................. 362/90 |
| 4,449,057 | A | * | 5/1984 | Ishiwata ......................... 307/43 |
| 4,491,978 | A | * | 1/1985 | Nagata et al. ................. 455/338 |
| 4,692,683 | A | * | 9/1987 | Lalmond ...................... 322/2 R |
| 4,763,589 | A | * | 8/1988 | Laidig et al. .................. 112/278 |
| 4,856,605 | A | * | 8/1989 | Cornelius et al. ......... 177/210 R |
| 5,012,160 | A | * | 4/1991 | Dunn Thompson .......... 313/149 |
| 5,522,943 | A | * | 6/1996 | Spencer et al. ............... 136/245 |
| 5,575,860 | A | * | 11/1996 | Cherney ........................ 136/245 |
| 5,602,726 | A | * | 2/1997 | Sakai .............................. 363/55 |
| 5,828,074 | A | * | 10/1998 | Pearlman ....................... 250/551 |
| 6,031,251 | A | * | 2/2000 | Gempe et al. .................... 257/84 |
| 6,216,480 | B1 | * | 4/2001 | Camus et al. ................ 62/235.1 |
| 6,326,764 | B1 | * | 12/2001 | Virtudes ....................... 320/101 |
| 6,339,188 | B1 | * | 1/2002 | Voelkner ....................... 136/251 |
| 6,372,979 | B1 | * | 4/2002 | Streetman ..................... 136/253 |

(Continued)

FOREIGN PATENT DOCUMENTS

| DE | 4216817 A1 | * 12/1993 | ............. H04N 7/10 |
| GB | 2047486 A | * 11/1980 | |
| JP | 02273401 A | * 11/1990 | |
| JP | 04325844 A | * 11/1992 | |

*Primary Examiner* — Daniel Cavallari
(74) *Attorney, Agent, or Firm* — Abelman, Frayne & Schwab

(57) ABSTRACT

A power supply device with solar cells, working with artificial light sources, for electronic equipment, includes a structure (1) internally covered with one or more solar cells (2), and a light source (3) such as LED arrays or lamps, which are provided power by the main line voltage directly, or through a stabilization circuit.

13 Claims, 1 Drawing Sheet

(56) References Cited

U.S. PATENT DOCUMENTS

| | | | |
|---|---|---|---|
| 6,448,489 B2 * | 9/2002 | Kimura et al. | 136/244 |
| 6,473,510 B1 * | 10/2002 | Marsh | 381/94.6 |
| 6,476,311 B1 * | 11/2002 | Lee et al. | 136/244 |
| 6,509,712 B1 * | 1/2003 | Landis | 320/101 |
| 6,660,929 B2 * | 12/2003 | Nelson | 136/251 |
| 6,750,463 B1 * | 6/2004 | Riley | 250/551 |
| 6,812,396 B2 * | 11/2004 | Makita et al. | 136/244 |
| 2002/0186020 A1 * | 12/2002 | Kondo et al. | 324/538 |

* cited by examiner

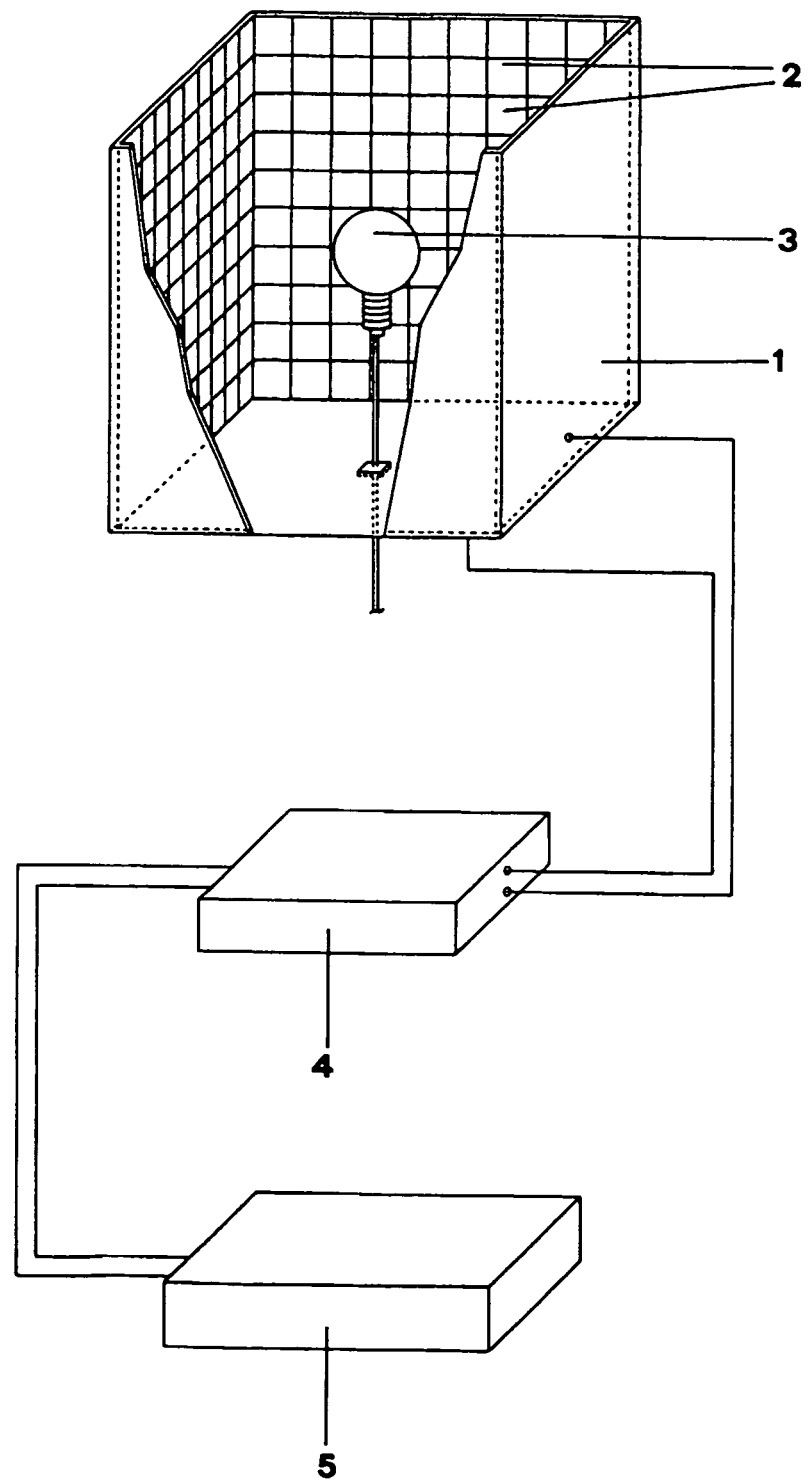

FEEDING DEVICE WITH SOLAR CELLS, WORKING WITH ARTIFICIAL LIGHT SOURCES, FOR ELECTRONIC EQUIPMENTS

FIELD OF INVENTION

The present invention is related to power supply devices, and more specifically to a power supply device with solar cells, working with artificial or natural light sources, for electronic equipment.

BACKGROUND OF INVENTION

It is known that one of the main problems of those electronic equipment that have to provide for the amplification of signals of small amplitude is caused by the background noise that limits the minimum signal that is possible to amplify.

The noise may be reduced by means of an accurate design and, even more, by paying attention to the energy source, i.e. to the power supply circuit.

Usually, all power supplies obtained by the mains voltage generate noise and interference, which limit the resolution of the electronic amplification equipment.

This phenomenon can be immediately noticed in audio equipment and it's the reason why sophisticated filtering circuits are used to reduce the noise due to the power supply.

Another solution for reducing said noise consists of the use of batteries or accumulators, that brings good results but has evident drawbacks. All interference due to the mains are eliminated; as since there are no rectification circuits, together with the mains injected noise also the band switching noise of the rectification diodes is eliminated.

From the tests performed on the use of the above power supply, a phenomenon appears though, that might be linked to the electrochemical reaction time or to the used materials, and said phenomenon is clearly audible in the audio field:

small signals relative to the high frequency harmonics, are not reproduced with the correct phase or are even cut off;
in terms of quality of listening, the ambience gets lost,
this phenomenon is audible in the reproduction as well as in the recording phase, and affects the ambience which is one of the most important parameters in the sound reproduction.

In alternative, it is possible to turn to generators like dynamos or alternators for obtaining an energy source that is not connected to the mains and it's not of electrochemical nature, but said generators comprise moving parts, are noisy and require a constant control of their operation.

SUMMARY OF THE INVENTION

It is an aim of the present invention to solve the above mentioned problems by means of an innovating solution that employs a current source of a considerable duration, that does not have moving parts and that does not require any control.

The device according to the present invention, includes a structure realized with one or more solar cells, connected in series or in parallel in order to obtain the required voltage and current level, and comprising a light source realized with LED (Light Emitting Diodes) arrays or lamps supplied by the mains or by other electric sources, directly or through a stabilization circuit. The device according to the present invention can obviously work also with natural light.

The results obtained in the electronic equipment provided with this kind of power supply have proved to be of higher quality than any kind of conventional power supply system.

The smaller signals can be reproduced without any kind of phase-displacement, with the correct amplitude, and with a definitively higher resolution.

In audio reproducing equipment, all the above advantages brings along an exceptional ambience reproduction, absolutely close to the one of the source sound, thus obtaining in a simple way results never obtained before by any known equipment.

Tests have been performed with sound recording systems and a considerable improvement has been obtained by means of the power supply device according to the present invention, when compared with the same equipment supplied by other systems.

The present invention will be explained more in detail hereinbelow relating to the enclosed drawing in which a preferred embodiment is shown.

BRIEF DESCRIPTION OF THE DRAWINGS

FIG. 1 depicts a schematic diagram of a power supply device of the present invention.

DETAILED DESCRIPTION OF THE INVENTION

FIG. 1 shows a power supply device realized with solar cells, which are illuminated by artificial light sources 3, for supplying power to electronic equipment 5. The power supply device includes a structure 1 preferably enclosing a light source 3 and internally covered with solar cells 2, where the light source 3 includes one or more lamps and/or LED arrays supplied by the main power lines. A secondary stabilized output power supply 4 to supply the electronic load 5 can be employed.

The power supply device with solar cells, working with artificial light sources, for electronic equipment, according to the present invention can be used in recording and reproducing equipment for audio and video signals and in all those devices where amplifiers requiring a high resolution are used, like electromedical equipment, measuring equipment, equipment for receiving radio signals, electronic telescopes and microscopes.

The invention claimed is:

1. A power supply device for providing an electrical output power having low background noise and static level to electronic equipment, comprising: a light source and a structure circumscribing the light source, the surface of the structure facing the light source being covered with solar cells for directly receiving illumination from the light source; and at least one electrical output through which said power supply provides said electrical output power having low background noise and static level to said electronic equipment, wherein said electronic equipment is selected from the group consisting of recording and reproducing equipment for audio and video signals, electronic telescopes and electronic microscopes.

2. The power supply device according to claim 1 further including a secondary stabilized output power supply connected to said electronic equipment.

3. The power supply device according to claim 2, wherein said light source is a fluorescent lamp.

4. The power supply device according to claim 2, wherein said light source is an LED array.

5. The power supply device according to claim 1, wherein said structure includes a bottom portion, at least one sidewall formed over the bottom portion, and a top portion formed over the at least one sidewall, said top portion having an opening sized to dissipate heat generated from said light source.

6. A method for providing electrical output power having a low level of background noise and static level from a power supply, said power supply comprising a light source adapted to receive power from a power source, and a structure circumscribing the light source, wherein the internal surface of the structure is covered with solar cells that face said light source, said method comprising:

activating said light source to illuminate said solar cells surrounding the light source; and providing said electrical output power having a low background noise and static level from said solar cells of said power supply to electronic equipment, wherein said electronic equipment is selected from at least one of recording and reproducing equipment for audio and video signals, electromedical equipment, measuring equipment, equipment for receiving radio signals, electronic telescopes and electronic microscopes.

7. A power supply device for providing an electrical output power having a low background noise and static level, said device comprising: a light source adapted to receive power from a power source, and a structure circumscribing the light source, the internal surface of the structure covered with solar cells orientated for exposure to the light source, said solar cells of said power supply device adapted to produce said electrical output power having a low background noise and static level in response to light emitted from said light source, wherein said electrical output power is provided at least in part by natural light radiating on said solar cells.

8. The power supply device according to claim 7, further including a secondary stabilized output power supply adapted to receive said electrical output power from said solar cells and connected to an electronic load.

9. The power supply device according to claim 7, wherein said light source is an incandescent lamp.

10. The power supply device according to claim 7, wherein said light source is a fluorescent lamp.

11. The power supply device according to claim 7, wherein said light source is an LED array.

12. The power supply device according to claim 7, wherein said electrical output power is coupled to electronic equipment.

13. The power supply device according to claim 12, wherein said electronic equipment is selected from at least one of recording and reproducing equipment for audio and video signals, electromedical equipment, measuring equipment, equipment for receiving radio signals, electronic telescopes and electronic microscopes.

* * * * *